US009024250B2

(12) United States Patent
Spraggs et al.

(10) Patent No.: US 9,024,250 B2
(45) Date of Patent: May 5, 2015

(54) ELECTRONIC DEVICE WITH LIGHT SENSOR ALIGNMENT STRUCTURES

(75) Inventors: Ian A. Spraggs, San Francisco, CA (US); Michael B. Wittenberg, Sunnyvale, CA (US); Jared M. Kole, San Francisco, CA (US); Ashutosh Y. Shukla, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 481 days.

(21) Appl. No.: 13/606,726

(22) Filed: Sep. 7, 2012

(65) Prior Publication Data

US 2014/0070081 A1    Mar. 13, 2014

(51) Int. Cl.
*G01J 1/02* (2006.01)
*G01J 1/04* (2006.01)
*G01J 1/42* (2006.01)
*H04M 1/02* (2006.01)

(52) U.S. Cl.
CPC .......... *G01J 1/0437* (2013.01); *Y10T 29/49826* (2015.01); *H04M 2250/12* (2013.01); *H04M 1/026* (2013.01); *G01J 1/0271* (2013.01); *G01J 1/0219* (2013.01); *G01J 1/0233* (2013.01); *G01J 2001/0257* (2013.01); *G01J 1/4204* (2013.01); *G01J 1/0247* (2013.01); *G01J 1/0488* (2013.01); *G01J 1/0266* (2013.01)

(58) Field of Classification Search
CPC ............. H04M 2250/12; H04M 1/026; G01J 2001/0257
USPC ................. 250/221, 239, 216, 559.3, 214 AL
See application file for complete search history.

(56) References Cited

U.S. PATENT DOCUMENTS

| 5,077,821 | A | * | 12/1991 | Makel et al. | .................. 385/120 |
| 7,835,001 | B2 | | 11/2010 | Kwack et al. | |
| 8,031,174 | B2 | | 10/2011 | Hamblin et al. | |
| 8,232,883 | B2 | | 7/2012 | Yao et al. | |
| 8,731,618 | B2 | * | 5/2014 | Jarvis et al. | .................. 455/566 |
| 2007/0251319 | A1 | * | 11/2007 | Campbell | ........................ 73/488 |
| 2008/0213480 | A1 | * | 9/2008 | Wells | ............................. 427/256 |
| 2012/0170284 | A1 | | 7/2012 | Shedletsky | |

OTHER PUBLICATIONS

MARCU, U.S. Appl. No. 10/663,574, filed Sep. 16, 2003.

* cited by examiner

*Primary Examiner* — Seung C Sohn
(74) *Attorney, Agent, or Firm* — Treyz Law Group; Kendall P. Woodruff

(57) ABSTRACT

Electronic devices may include light sensors. The light sensors may include alignment features. The light sensors may be optically aligned with an aperture in an opaque structure. The opaque structure may be formed from an opaque material or a transparent material with an opaque coating. The light sensor may be mounted in a support structure that has been optically aligned with the aperture. The light sensor or the support structure may include extended portions that are transparent to ultraviolet light. Ultraviolet light may be transmitted through the extended portions to cure adhesive that attaches the light sensor or the support structure to the opaque structure. The light sensor may be optically aligned with the aperture by viewing the aperture through an opening in the support structure, by viewing the alignment features on the light sensor through the aperture or by gathering alignment data using the light sensor during alignment operations.

28 Claims, 18 Drawing Sheets

ELECTRONIC DEVICE WITH LIGHT SENSOR ALIGNMENT STRUCTURES

BACKGROUND

This relates generally to electronic devices, and more particularly, to electronic devices with light sensors.

Electronic devices often include light sensors. For example, cellular telephones often include a proximity sensor that determines a distance to a user of the device by emitting light toward the user and detecting reflected light from the user.

Proximity sensors are often mounted within a device enclosure and transmit and receive the light through a transparent aperture in the enclosure. It can be difficult to align the proximity sensor with the aperture. In some situations, a misalignment with the aperture can lead to diminished signal strength for the proximity sensor.

It would therefore be desirable to be able to provide improved methods and structures for mounting light sensors in electronic devices.

SUMMARY

An electronic device may be provided with one or more light sensors. A light sensor may be an ambient light sensor, a proximity sensor, a camera, or other light sensor.

Systems, methods and structures for optically aligning light sensors with associated apertures that allow light to be transmitted through the apertures are provided. An alignment system may include one or more cameras, one or more actuating members, and computing equipment for operating the cameras and actuating members.

During assembly operations, in one example, a camera may be used to view the aperture through a mounting structure for the light sensor. The computing equipment may use images gathered by the camera to determine the position of the aperture and the position of the support structure. The actuating members may move the mounting structure into alignment with the aperture based on the detected positions of the aperture and the support structure. When the support structure has been aligned with the aperture, adhesive may be used to secure the support structure to the transparent cover layer. The light sensor may then be secured in the support structure that has been aligned with the aperture.

In another example, the light sensor may include alignment features that can be viewed by a camera through the aperture during alignment operations. The computing equipment may use images gathered by the camera to determine the position of the aperture and the position of the alignment features on the light sensor. The actuating members may move the light sensor into alignment with the aperture based on the detected positions of the aperture and the alignment features. When the light sensor has been aligned with the aperture, adhesive may be used to secure the light sensor to the transparent cover layer.

In another example, a light-generating element on a proximity sensor may be used to emit light through the aperture and onto a camera while the actuating members move the light sensor among various positions. The light sensor may then be returned to the position at which a maximum amount of light from the proximity sensor was detected.

In other examples, alignment data may be gathered using the light sensor itself. For example, an external light source may be used to the emit light onto the light sensor through the aperture while the actuating members move the light sensor among various positions. The light sensor may then be returned to the position at which a maximum amount of light from the external light source was detected. As another example, a light-generating element on a proximity sensor may be used to emit light through the aperture that is reflected from an object back through the aperture onto a light sensitive portion of the proximity sensor while the actuating members move the light sensor among various positions. The light sensor may then be returned to the position at which a maximum amount of reflected light from the object was detected.

Further features of the invention, its nature and various advantages will be more apparent from the accompanying drawings and the following detailed description of the preferred embodiments.

DETAILED DESCRIPTION

An electronic device may be provided with light sensors. A light sensor may be an ambient light sensor, a proximity sensor, a camera, or other light sensor.

The electronic device may include a display. The display may have display layers for displaying images and a touch-sensitive layer for gathering user touch input. A display touch-sensitive layer may include touch-sensitive electrodes based on capacitive, resistive, or other technologies.

The electronic device may include processing circuitry that gathers light sensor data and changes settings for the display based on the light sensor data. For example, proximity sensor data may be used to determine that a cellular telephone has been placed against a user's face. The processing circuitry may disable touch-sensitive portions of the display when the device is against a user's face to avoid unintentional user input during a telephone call. As another example, ambient light sensor data may be used to determine that a light has been turned on or off in a room containing the device or that the device has been moved into bright sunlight. The processing circuitry may increase or decrease the brightness of the display based on detected decreases or increases in ambient light.

The electronic device may include an enclosure such as a housing. The enclosure may include a transparent cover layer such as a glass layer or transparent plastic layer for the display. Portions of the transparent cover layer may be covered by an opaque masking layer such as a black ink layer that prevents internal components from being viewed by a user of the device.

Light sensors such as proximity sensors and ambient light sensors may be mounted against a portion of the housing. The housing may include an aperture that allows light to pass through the housing to and/or from the light sensor. For example, the light sensor may be mounted against a portion of the transparent cover layer that is covered by the opaque masking layer. The opaque masking layer may include a portion that forms the aperture. As examples, the portion that forms the aperture may be an opening in the opaque masking layer that allows visible and/or infrared light to pass through the aperture or may include a portion of the opaque masking layer that is configured to allow infrared light to pass while preventing visible light from passing.

Light sensor performance may depend on the accuracy of the alignment of the light sensor with the aperture. The light sensor may therefore be optically aligned with the aperture or may be mounted in a support structure that has been optically aligned with the aperture.

Figure 1:
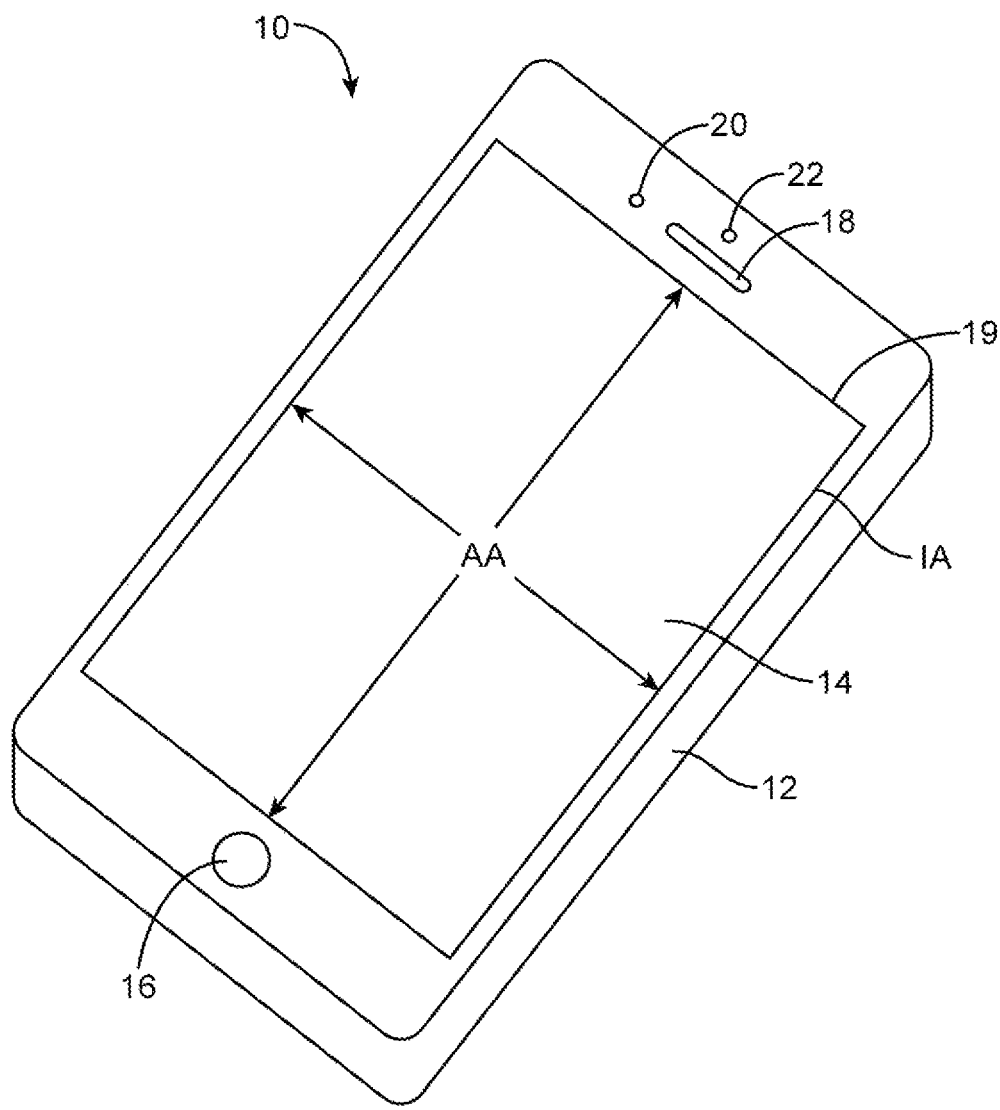
FIG. 1 is a perspective view of an illustrative electronic device such as a handheld electronic device with a display in accordance with an embodiment of the present invention.

An illustrative electronic device that may be provided with one or more optically aligned light sensors is shown in FIG. 1. FIG. 1 shows how electronic device 10 may be a handheld device such as a cellular telephone, music player, gaming device, navigation unit, or other compact device. In this type of configuration for device 10, device 10 may include housing 12 having opposing front and rear surfaces and a peripheral edge portion (sometimes referred to as a band). The front surface of housing 12 may be formed from a cover layer for a display such as display 14.

Display 14 may be a liquid crystal display, an organic light-emitting diode (OLED) display, or other suitable display. Display 14 may include display pixels formed from light-emitting diodes (LEDs), organic light-emitting diodes (OLEDs), plasma cells, electronic ink elements, liquid crystal display (LCD) components, and/or other suitable display pixel structures. Display 14 may, if desired, include capacitive touch sensor electrodes for a capacitive touch sensor array or other touch sensor structures (i.e., display 14 may be a touch screen).

Display 14 may be mounted on a front face of housing 12. Display 14 may, if desired, have a display cover layer such as a glass layer, plastic layer, or other exterior layer that forms a portion of an enclosure for device 10. An outer display cover layer may include openings for components such as button 16 and for speaker port 18.

Display 14 may be characterized by an active region such as rectangular active region AA and an inactive region such as peripheral inactive region IA. Rectangular active region AA may be bounded by rectangular border 19. Inactive region IA may have the shape of a rectangular ring that surrounds the periphery of active region AA. If desired, some of the edges of display 14 may be borderless (i.e., the width of the inactive region on one or more edges may be zero or may be negligibly small). The illustrative configuration of FIG. 1 in which display 14 is surrounded by an inactive border region is merely illustrative.

The underside of a display cover layer in inactive area IA may be provided with an opaque masking layer such as a layer of black ink to help hide internal components such as components from view by a user of device 10. If desired, openings may be provided in the opaque masking layer to allow light to reach light-sensitive components such as camera 20 or light sensor 22 (e.g., a proximity sensor or an ambient light sensor) through the cover layer for display 14.

Device 10 may have a housing enclosure such as housing 12. Electronic components such as light sensor 22 and camera 20 may be mounted within housing 12. Housing 12, which is sometimes referred to as a case or enclosure, may be formed of materials such as plastic, glass, ceramics, carbon-fiber composites and other composites, metal, aluminum, other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures such as glass or plastic portions that have been mounted to internal frame elements or external housing members such as a peripheral band that runs around an edge of device 10).

Touch-sensor components such as an array of capacitive touch-sensor electrodes formed from transparent materials such as indium tin oxide may be formed on the underside of a display cover layer, may be formed on a separate display layer such as a glass or polymer touch-sensor substrate, or may be integrated into other display layers (e.g., substrate layers such as a thin-film transistor layer).

The configuration for device 10 shown in FIG. 1 is merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Figure 2:
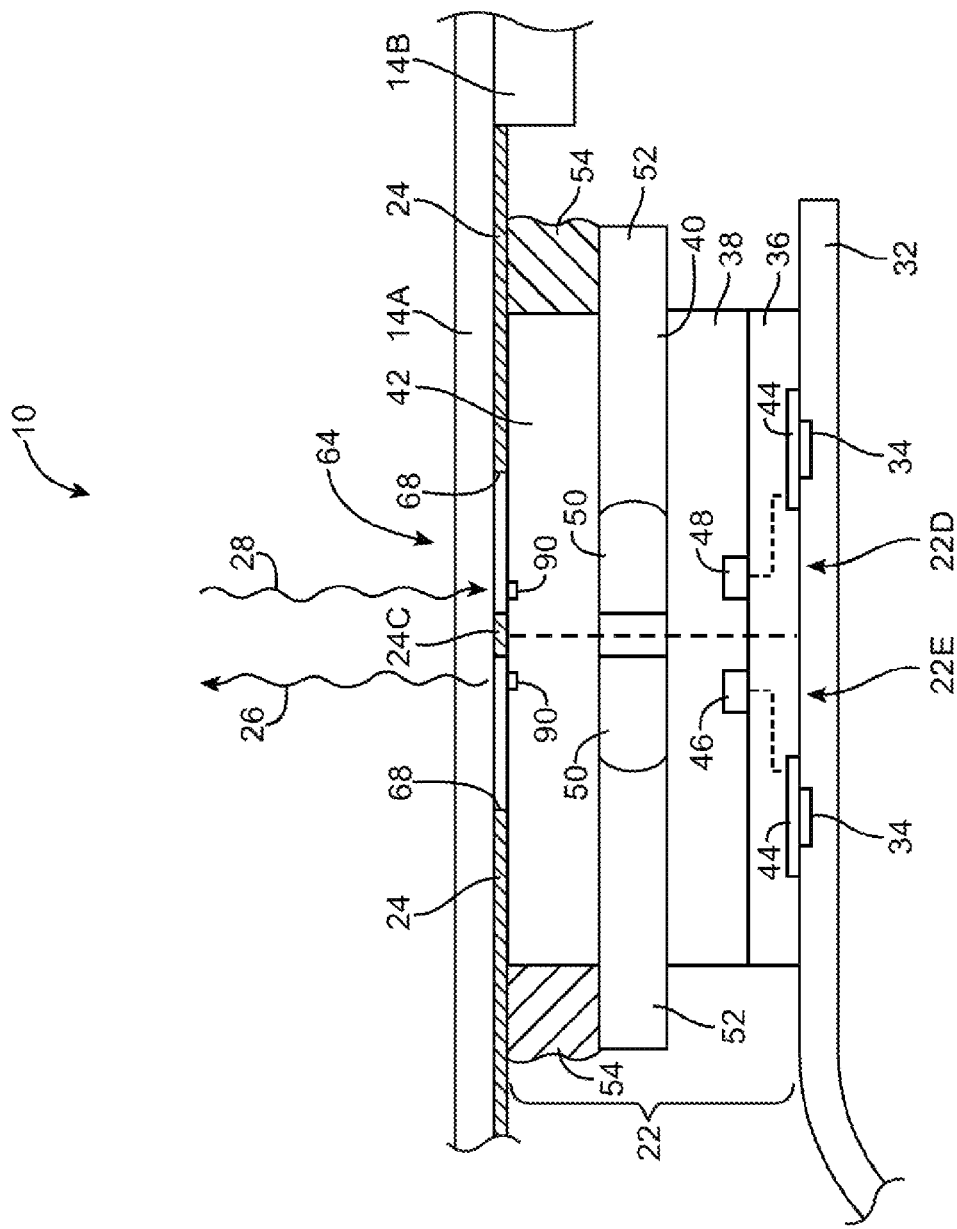
FIG. 2 is a cross-sectional side view of an illustrative light sensor that has been optically aligned with an aperture in accordance with an embodiment of the present invention.

A cross-sectional side view of an illustrative configuration that may be used for light sensor 22 of device 10 is shown in FIG. 2. As shown in FIG. 2, light sensor 22 may be implemented as a proximity sensor that includes light emitting portion 22E and light detecting portion 22D. Light sensor 22 may be mounted against a transparent cover layer such as glass layer 14A of display 14. Display 14 may also include display layers 14B for generating images to be displayed on display 14. Display layers 14B may include polarizer layers, color filter layers, transistor layers, adhesive layers, layers of liquid crystal material, other layers for generating display images, and/or one or more layers of touch-sensitive components such as an array of capacitive touch-sensor electrodes formed from transparent materials such as indium tin oxide.

An opaque masking layer such as black mask 24 may be formed on an inner surface of glass layer 14. Aperture 64 for light sensor 22 may be formed from an opening in opaque masking layer 24. If desired, opaque masking layer 24 may include central portion 24C that separates aperture 64 into multiple portions. However, this is merely illustrative. If desired, aperture 64 may be formed without any central masking portions.

Aperture 64 may be a circular aperture, a rectilinear aperture, or an aperture having any suitable shape (e.g., edge 68 of aperture 64 may have shape that defines a circle, a rectangle, a square, or any other suitable shape).

Light sensor 22 may emit light 26 from light emitting portion 22E through aperture 64 and receive light 28 at light-sensitive portion 22D through aperture 64.

Light sensor 22 may include multiple layers such as circuitry layer 36, light processing layer 38, lens layer 40, and spacer layer 42. Circuitry layer 36 may include electrical contacts 44 that are coupled to associated electrical contacts 34 on a printed circuit such as flexible printed circuit 32. Flexible printed circuit 32 may be used to route signals to and from light sensor 22 to processing circuitry for device 10. Circuitry in circuitry layer 36 may be used to operate a light sensitive element such as light sensor 48. Light sensor 48 may be a single light-sensitive element or an array of light-sensitive elements.

Circuitry in circuitry layer 36 may also be used to operate a light-emitting element such as light source 46. Light source 46 may, for example, be a light-emitting diode. Light source 46 may be configured to emit light such as infrared light 26 through aperture 64. Some of infrared light 26 may be reflected by an object in the vicinity of device 10 and reflected portion 28 of light 26 may pass through aperture 64 and be detected by light sensitive element 48.

Lenses 50 in lens layer 40 may help focus outgoing light 26 through aperture 64 and incoming light 28 onto sensor 48. Lens layer 40 may include extended portions 52 that extend beyond the edges of other layers of light sensor 22. Extended portions 52 may be formed from a material that is transparent to ultraviolet light so that ultraviolet light may be used to cure adhesive 54. Adhesive 54 may be an ultra-violet light cured adhesive that secures light sensor 22 to cover layer 14A.

As shown in FIG. 2, light sensor 22 may include alignment features such as alignment marks 90 that are visible through aperture 64. During assembly operations for device 10, light sensor 22 may be optically aligned with aperture 64 by viewing alignment marks 90 and edge 68 of aperture 64 while positioning sensor 22 behind aperture 64.

Figure 3:
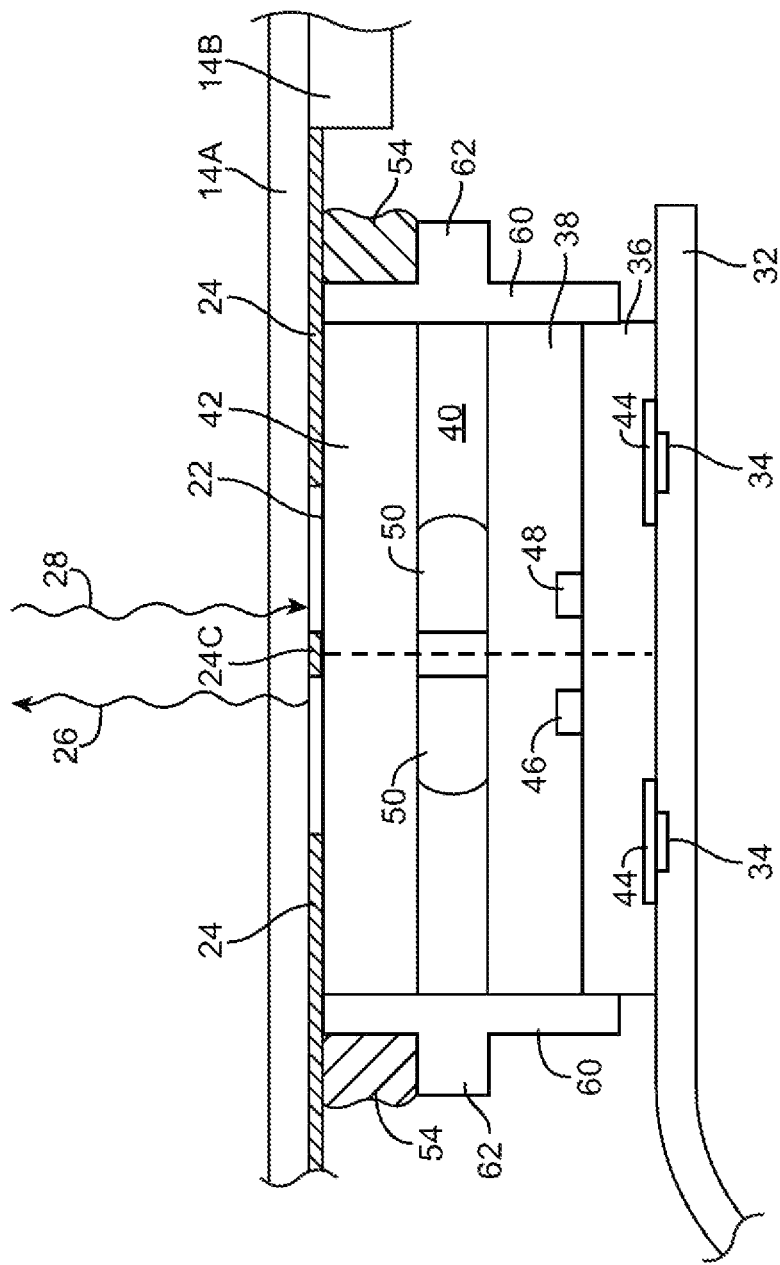
FIG. 3 is a cross-sectional side view of an illustrative light sensor that is mounted in a support structure that has been optically aligned with an aperture in accordance with an embodiment of the present invention.

The arrangement of FIG. 2 in which light sensor 22 has alignment marks 90 and extended portions 52 on lens layer 40 is merely illustrative. If desired, light sensor 22 may be mounted behind aperture 64 by inserting light sensor 22 into a structure such as support structure 60 (sometimes referred to herein as a sensor bracket) that has been optically aligned with aperture 64 as shown in FIG. 3.

Support structure 60 may be formed from plastic, metal, or other suitable materials. Support structure 60 may include extended portions 62. Adhesive such as adhesive 54 may be interposed between extended portions 62 and cover layer 14A so that adhesive 54 attaches structure 60 to cover layer 14A. Light sensor 22 may be attached to support structure 60 using mechanical members such as screws or fasteners, using adhesive, or may fit tightly within structure 60 so that pressure from structure 60 on light sensor 22 holds light sensor 22 within structure 60.

Figure 4:
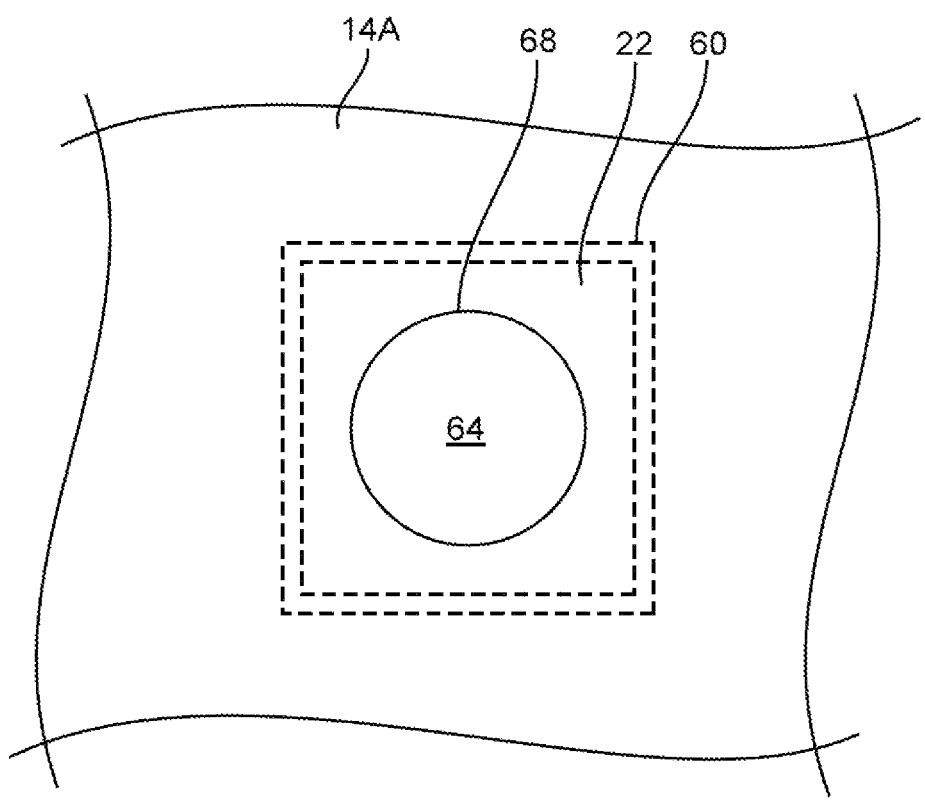
FIG. 4 is a top view of a portion of an illustrative transparent cover layer for a device display showing how a light sensor may be mounted behind an aperture on the transparent cover layer in accordance with an embodiment of the present invention.

As shown in the top view of cover layer 14A in FIG. 4, light sensor 22 (and, if desired, support structure 60) may be mounted behind an aperture such as aperture 64 that has a lateral width that is less that the lateral width of light sensor 22.

Figure 5:
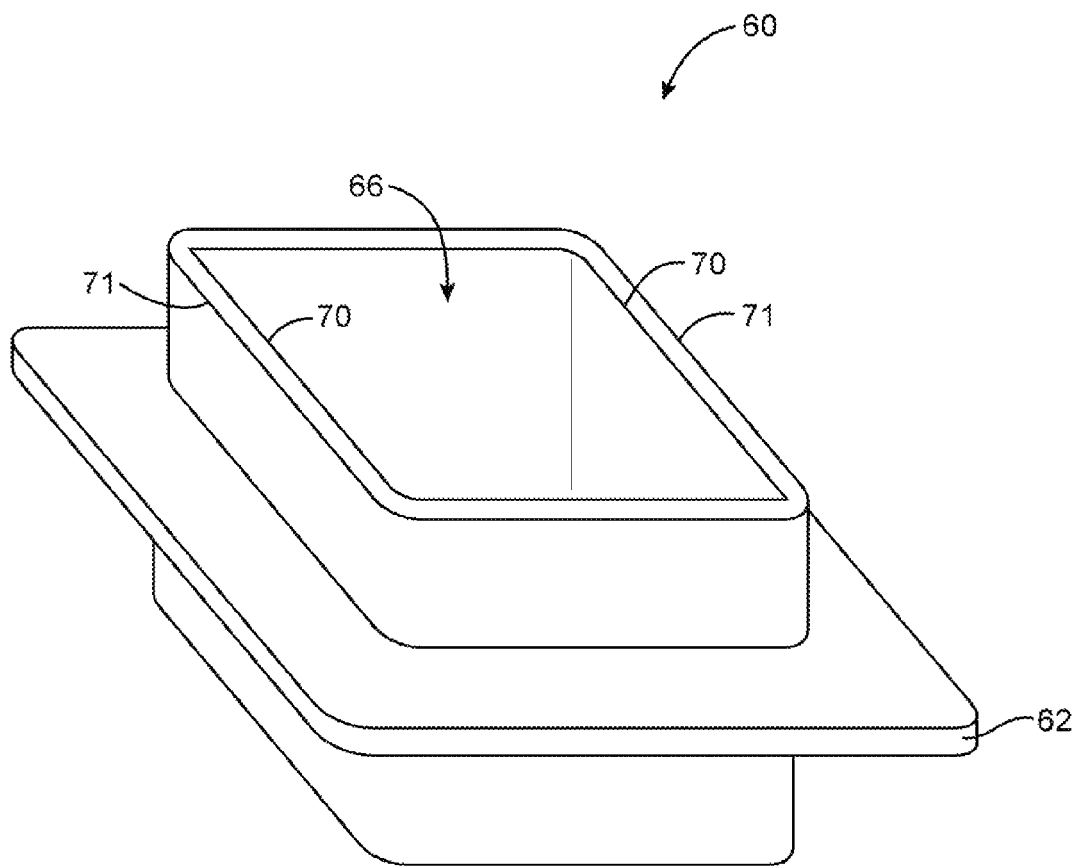
FIG. 5 is a perspective view of an illustrative support structure that may be optically aligned with an aperture in accordance with an embodiment of the present invention.

As shown in the perspective view of support structure 60 in FIG. 5, extended portion 62 of structure 60 may be extend around all four edges of a rectilinear (e.g., square) support structure. Support structure 60 may include an opening such as central opening 66. Opening 66 may be designed to receive light sensor 22. The portion of structure 60 that surrounds opening 66 may have an inner edge 70 and an outer edge 71. Inner edge 70 and or outer edge 71 may be detected by alignment equipment for aligning structure 60 with aperture 64 during device assembly operations for device 10.

Figure 6:
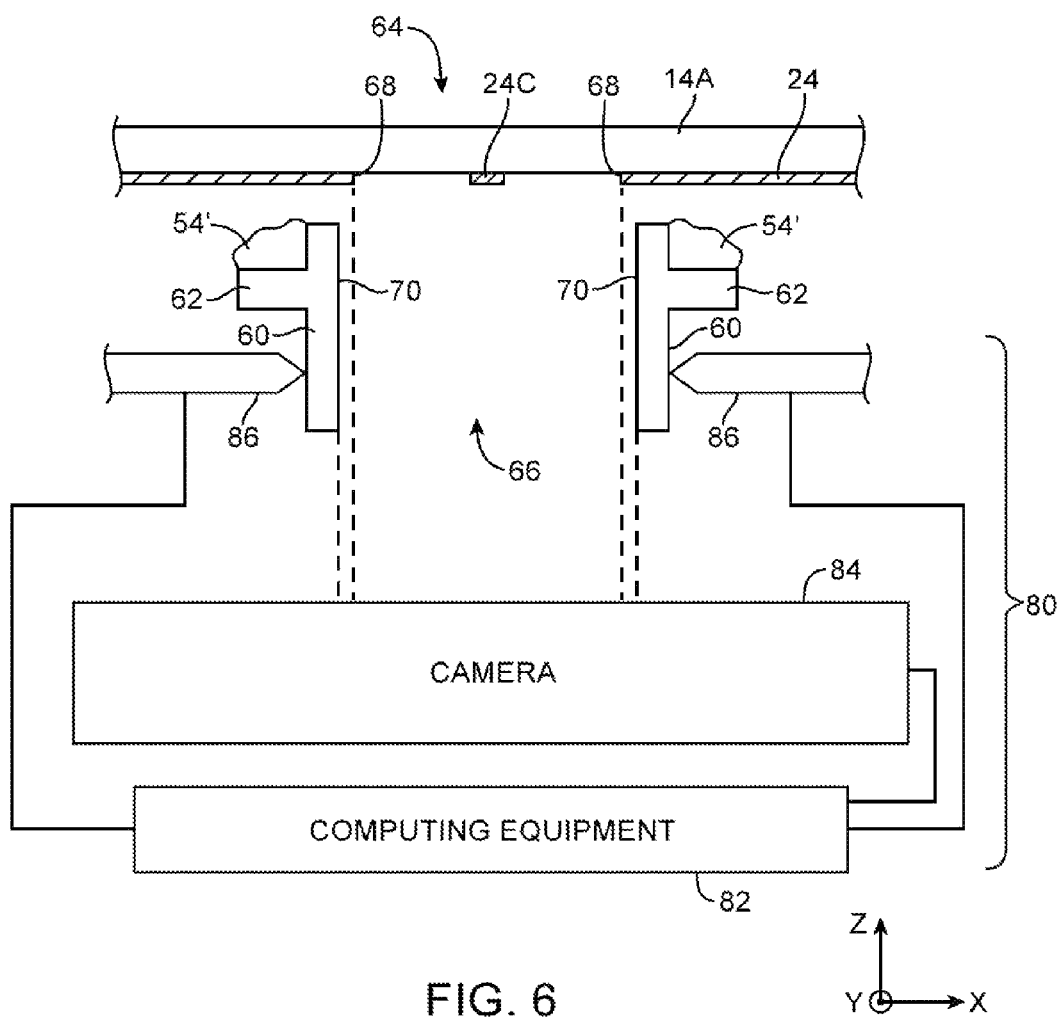
FIG. 6 is a cross-sectional side view of an illustrative support structure during alignment operations using an alignment system in accordance with an embodiment of the present invention.

As shown in FIG. 6, support structure 60 may be aligned with aperture 64 using alignment equipment such as alignment system 80. Alignment system 80 may include computing equipment 82, one or more cameras such as camera 84, and actuating members 86. Alignment system 80 may also include masking structure for camera 84 and/or a reflective structure that reflects light from light sensor 22. Computing equipment 82 may be used to operate cameras 84 and actuating members 86 and to process alignment data from camera 84 (or, if desired, from sensor 22).

Actuating members 86 may be used to hold and move support structure 60 based on alignment data obtained using camera 84. Cameras 84 may be used to gather images of support structure 60 and aperture 64 through opening 66 in support structure 60. Actuating members 86 may move structure 60 in a direction parallel to the x-y plane of FIG. 6 until edge 70 of structure 60 is in a suitable (aligned) position with respect to edge 68 of aperture 64.

Actuating members 86 may also move structure 60 along a direction parallel to the z-direction of FIG. 6 into a position adjacent to cover layer 14A. Prior to alignment operations, a light-curable liquid adhesive such as liquid adhesive 54' (i.e., adhesive 54 of FIG. 3 in liquid (uncured) form) may be applied to structure 60.

Figure 7:
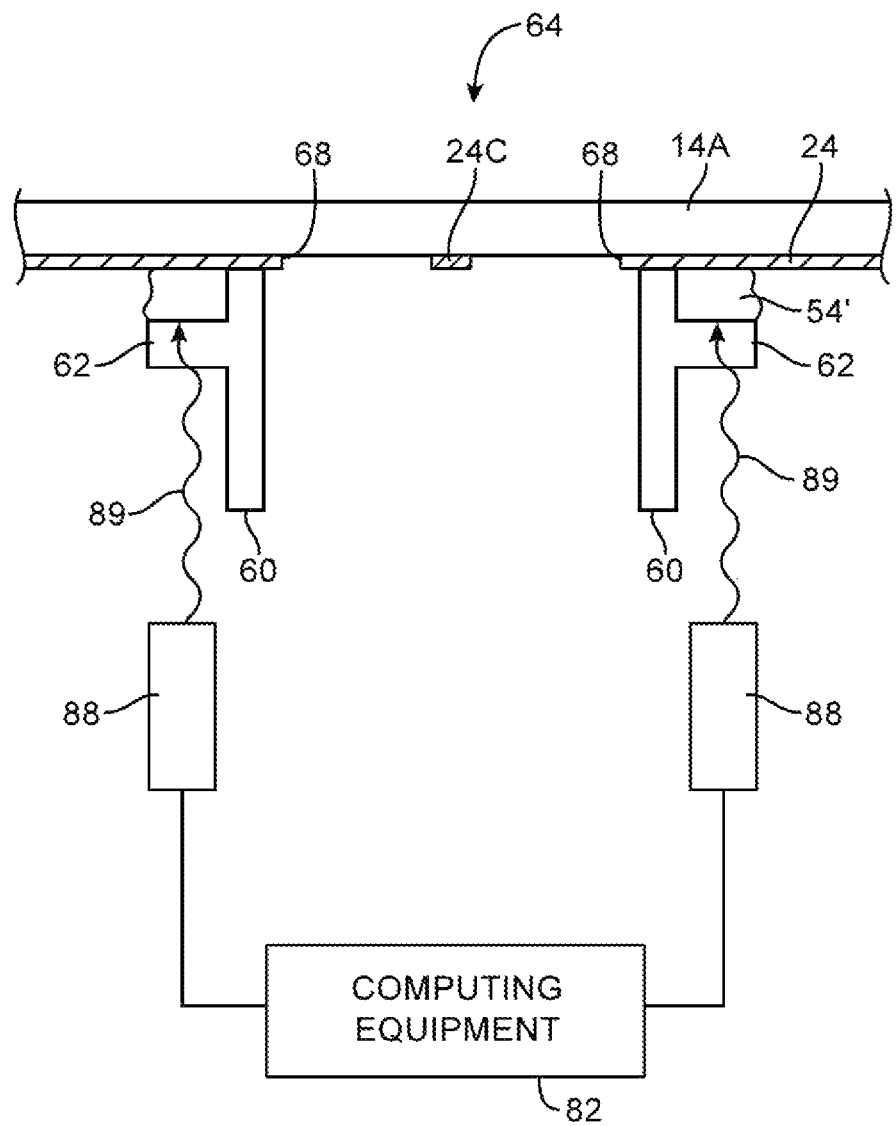
FIG. 7 is a cross-sectional side view of an illustrative support structure showing how light may pass through portions of the support structure to cure adhesive that secures the support structure to a housing structure in accordance with an embodiment of the present invention.

Following alignment and placement of structure 60, structure 60 may be secured to cover layer 14A using liquid adhesive 54' by illuminating adhesive 54' as shown in FIG. 7. One or more light sources such ultraviolet (UV) light sources 88 may be used to illuminate adhesive 54' with UV light 89 to cure adhesive 54'. Light sources 88 may be operated by a technician or may be automatically operated using computing equipment 82.

Figure 8:
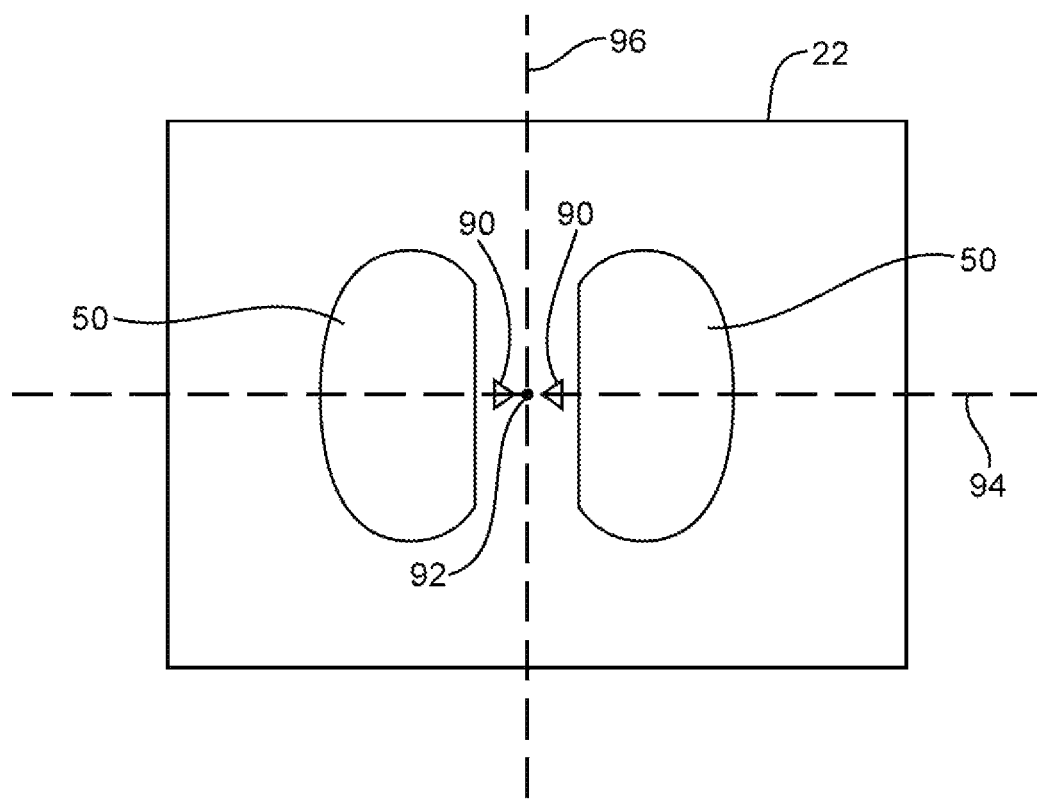
FIG. 8 is a top view of an illustrative light sensor having alignment features that can be viewed through an aperture in accordance with an embodiment of the present invention.

As described above in connection with FIG. 2, if desired, light sensor 22 may be optically aligned with aperture 64 and attached to layer 14A without the use of a support structure. As shown in FIG. 8, light sensor 22 may be provided with alignment features such as alignment marks 90 on a top surface of sensor 22. Alignment features 90 may be molded features in a plastic portion of sensor 22, printed features on the top surface of sensor 22, embedded reflective objects such as metal in the top surface of sensor 22 or other visible alignment marks on sensor 22.

In the example of FIG. 8, sensor 22 includes two alignment marks 90 having a triangular shape. A line such as line 96 that is equidistant from alignment marks 90 and a line such as line 94 that is perpendicular to line 96 and passes through the opposing points of triangular alignment marks 90 may indicate center point 92 of sensor 22.

Figure 9:
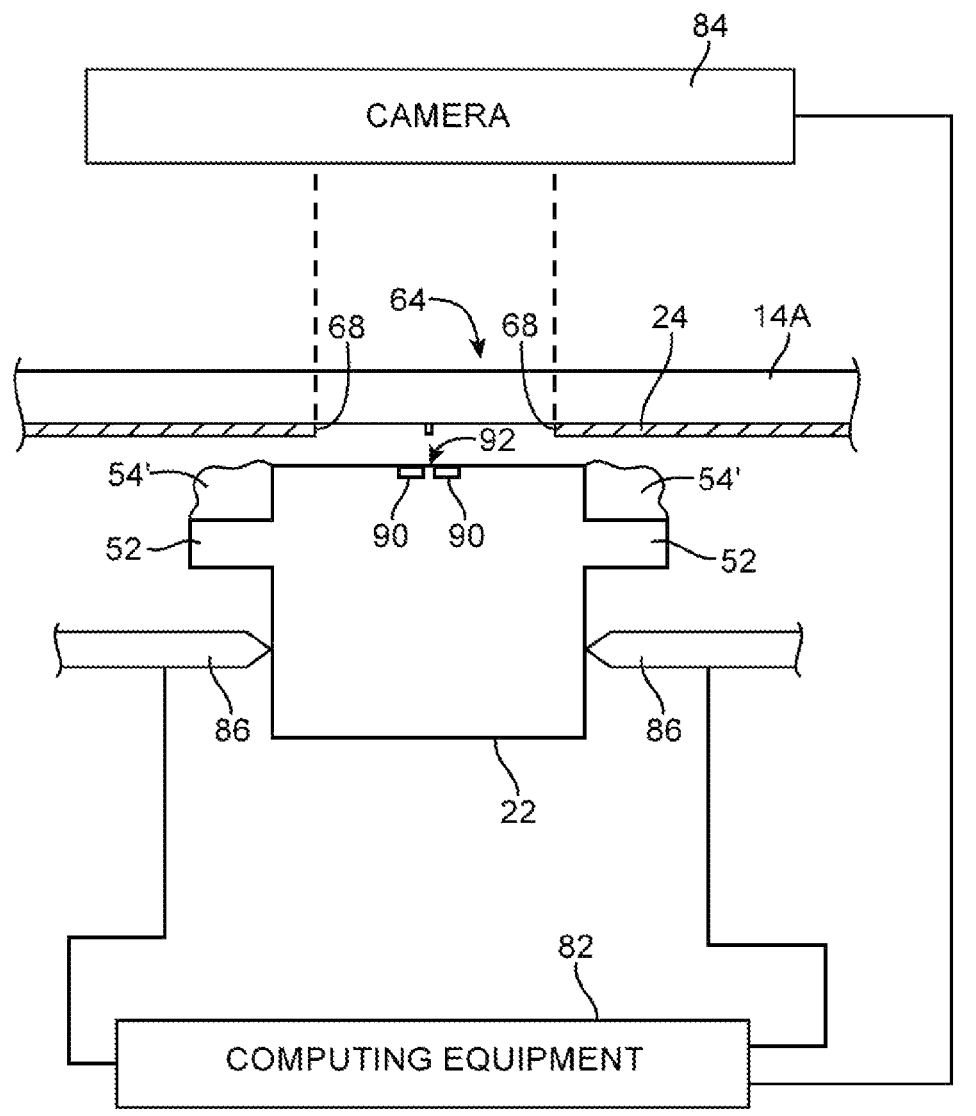
FIG. 9 is a cross-sectional side view of an illustrative light sensor having alignment features during alignment operations using an alignment system in accordance with an embodiment of the present invention.

As shown in FIG. 9, camera 84 may be used to view alignment marks 90 of sensor 22 through aperture 64 during alignment operations. Camera 84 may be used to gather images of aperture 64 and of alignment marks 90 through aperture 64. Computing equipment 82 may be used to determine the location of edge 68 of aperture 64 using the gathered images of aperture 64. Computing equipment 82 may be used to determine the location of center point 92 of sensor 22 using the gathered images of alignment marks 90.

During alignment operations, actuating members 86 may be used to hold and move light sensor 22 based on the determined locations of edge 68 of aperture 64 and center point 92. Actuating members 86 may move sensor 22 in a direction parallel to the x-y plane of FIG. 9 until center point 92 is at a suitable (aligned) position with respect to edge 68.

Figure 10:
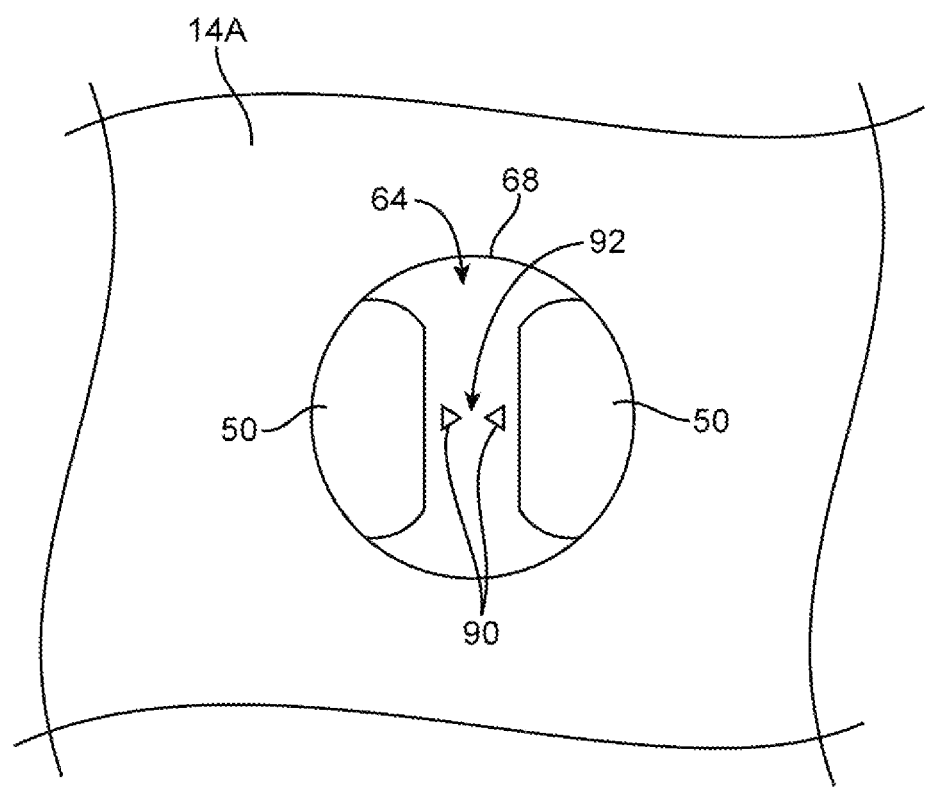
FIG. 10 is a top view of a portion of an illustrative transparent cover layer for a device display showing how alignment features on a light sensor may be viewed through an aperture on a transparent cover layer in accordance with an embodiment of the present invention.

For example, as shown in the top view of aperture 64 in FIG. 10, sensor 22 may be positioned so that center point 92 is equidistant from all points on edge 68 of a circular aperture 64 as viewed through aperture 64. However, this is merely illustrative. If desired, aperture 64 may have a shape other than a circular shape, point 92 may be aligned at a predetermined distance from one or more specific points on edge 68, or sensor 22 may be aligned with aperture 64 using alignment marks 90 without determining a center point of sensor 22.

Actuating members 86 may also move sensor 22 along a direction parallel to the z-direction of FIG. 9 into a position adjacent to cover layer 14A. Prior to alignment operations, a light-curable liquid adhesive such as liquid adhesive 54' (i.e., adhesive 54 of FIG. 3 in liquid (uncured) form) may be applied to sensor 22 (e.g., to extended portions 52 of sensor 22).

Figure 11:
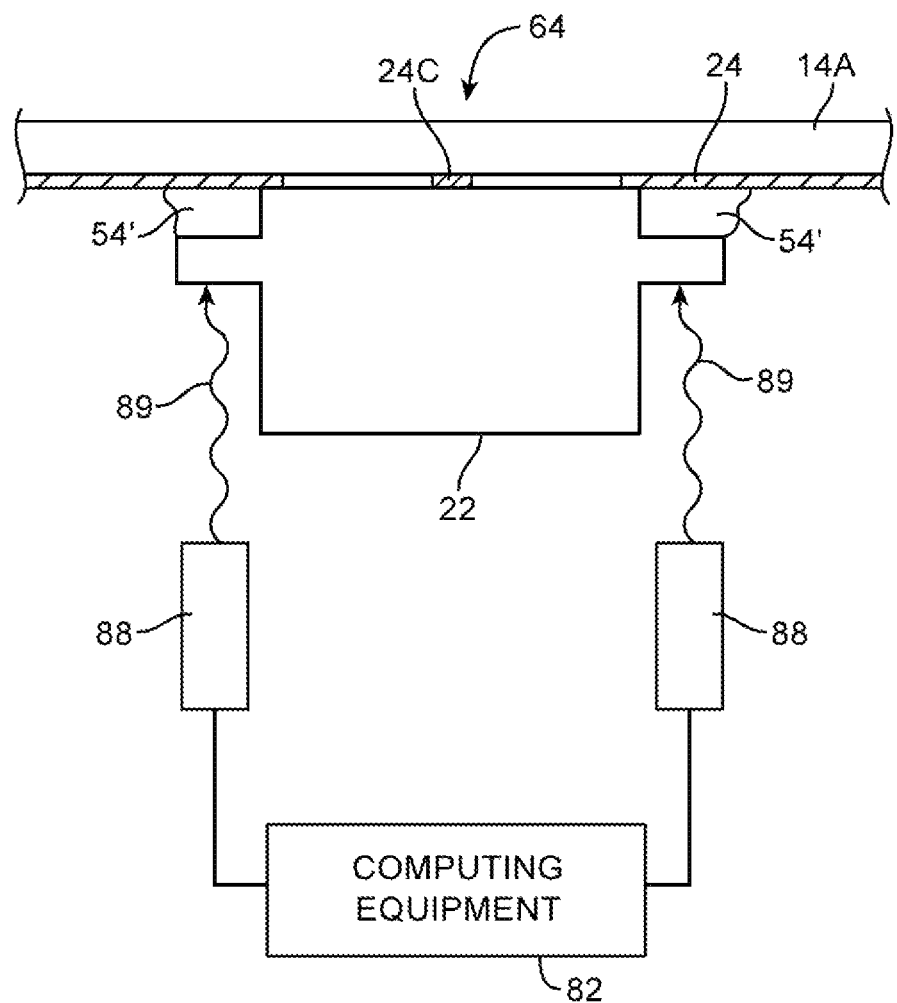
FIG. 11 is a cross-sectional side view of an illustrative light sensor showing how light may pass through portions of the light sensor to cure adhesive that secures the light sensor to a housing structure in accordance with an embodiment of the present invention.

Following alignment and placement of sensor 22, sensor 22 may be secured to cover layer 14A using liquid adhesive 54' by illuminating adhesive 54' as shown in FIG. 11. One or more light sources such ultraviolet (UV) light sources 88 may be used to illuminate adhesive 54' with UV light 89 to cure adhesive 54'. Light sources 88 may be operated by a technician or may be automatically operated using computing equipment 82.

Figure 12:
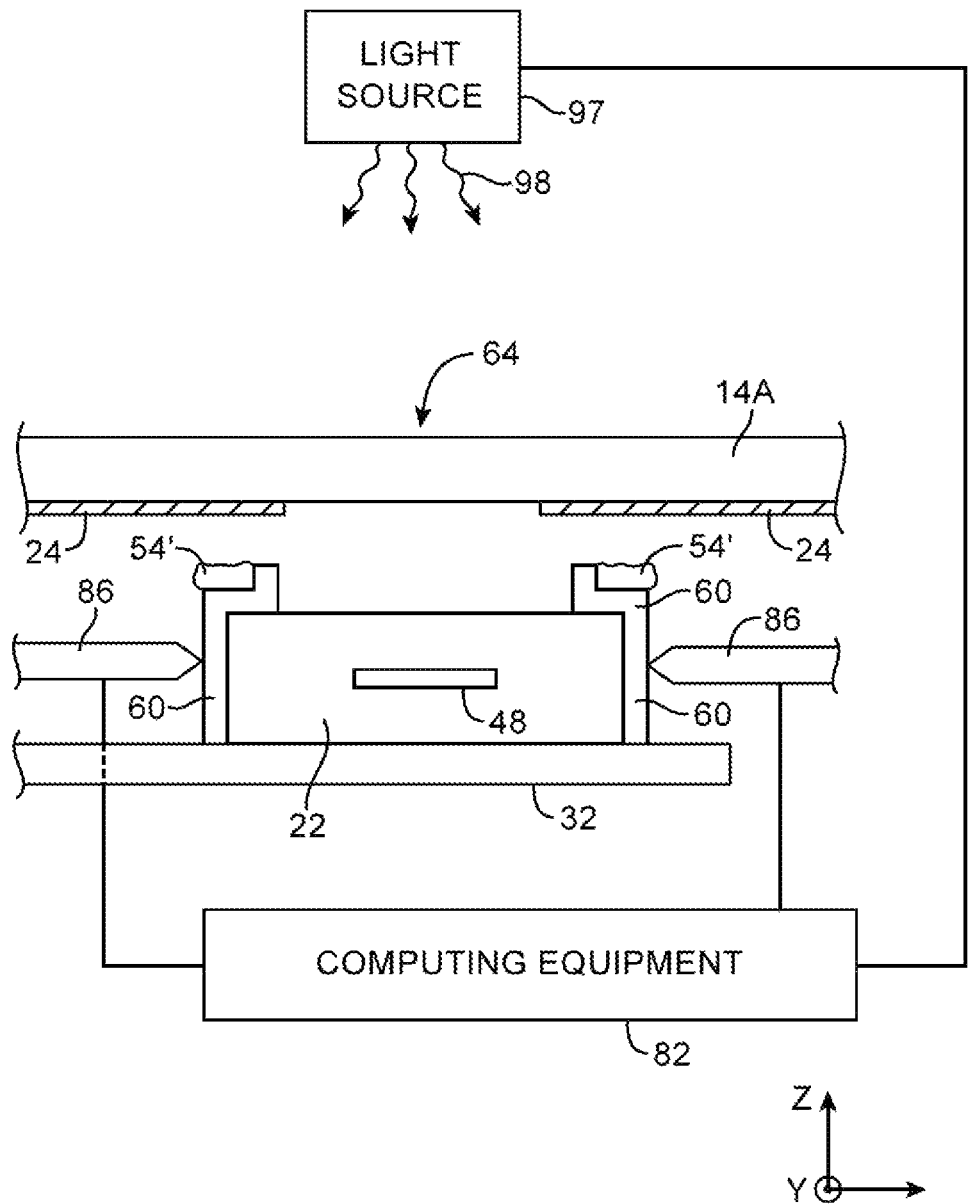
FIG. 12 is a cross-sectional side view of an illustrative light sensor showing how light from an external light source may be detected by the light sensor during alignment operations using an alignment system in accordance with an embodiment of the present invention.
Figure 13:
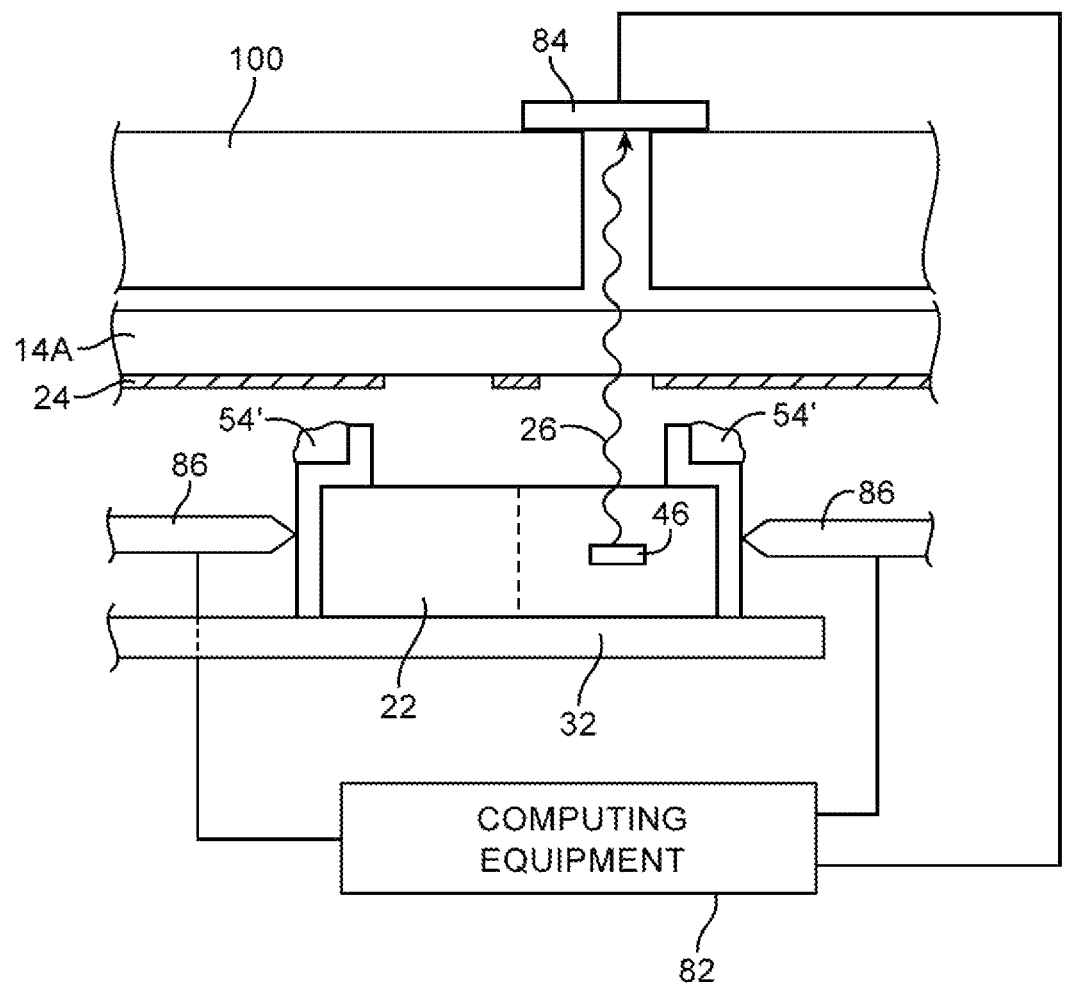
FIG. 13 is a cross-sectional side view of an illustrative light sensor showing how light emitted by a light source on the light sensor may be detected by a camera during alignment operations using an alignment system in accordance with an embodiment of the present invention.
Figure 14:
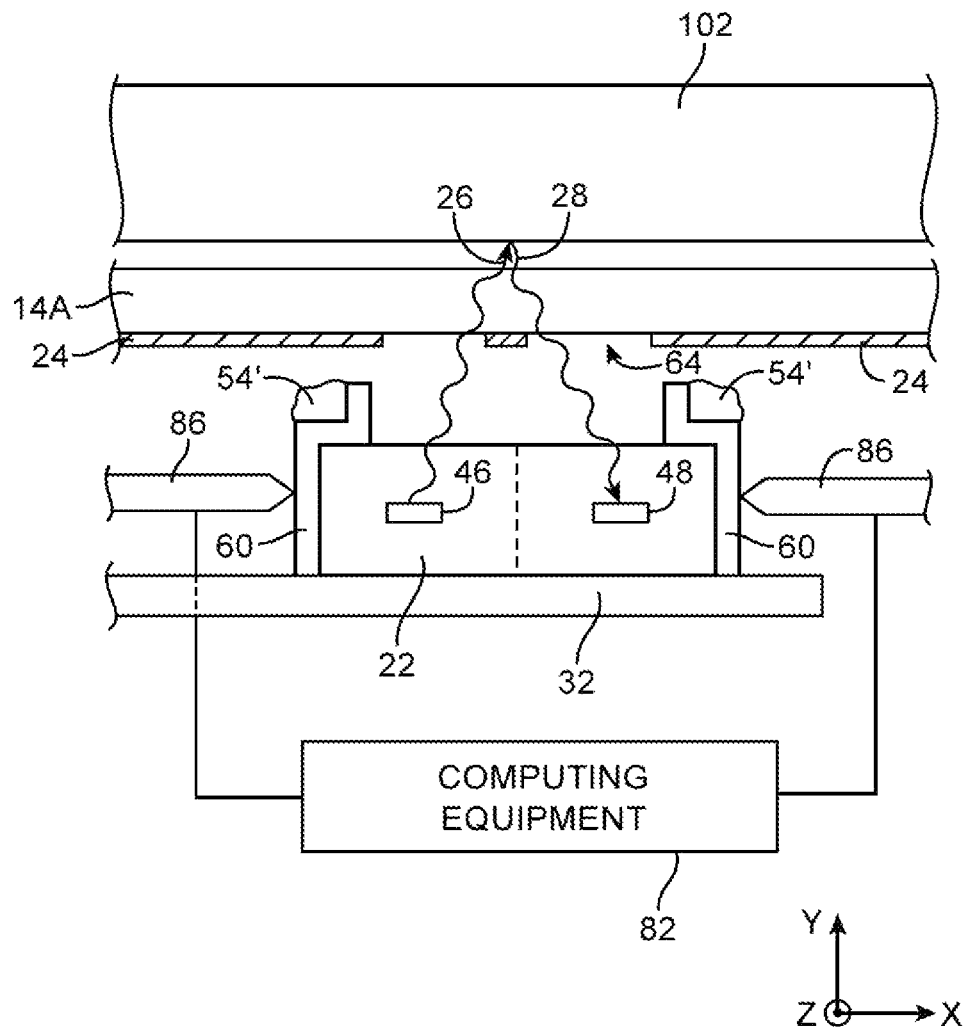
FIG. 14 is a cross-sectional side view of an illustrative light sensor showing how light emitted by a light source on the light sensor may be reflected from an object and detected by a light sensing portion on the light sensor during alignment operations using an alignment system in accordance with an embodiment of the present invention.

The examples of FIGS. 6, 7, 8, 9, 10, and 11, in which sensor 22 has been optically aligned with aperture 64 by viewing aperture 64 though an opening in structure 30 or by viewing alignment marks on sensor 22 through aperture 64 are merely illustrative. FIGS. 12, 13, and 14 show examples of ways in which sensor 22 may be optically aligned with aperture 64 by gathering alignment data using sensor 22 during alignment operations. As shown in FIGS. 12, 13, and 14, flexible printed circuit 32 may be attached to sensor 22 prior to alignment operations for sensor 22.

Alignment data may be gathered using sensor 22 and transmitted to processing circuitry in device 10 using circuit 32. The alignment data may be processed using processing circuitry in device 10 or may be transmitted to computing equipment 82 for processing. Processing alignment data may include determining an optimally aligned position for sensor 22 based on the gathered alignment data.

In the example of FIG. 12, alignment data is gathered using an external light source such as light source 97 to emit light such as light 98 onto cover layer 14A. Some of light 98 may pass through aperture 64 onto light-sensitive element 48 of sensor 22. Element 48 may be a light-sensitive element of an ambient light sensor that does not include a light source or may be a light-sensitive element of a proximity sensor that includes a light source such as an LED in addition to element 48.

Actuating members 86 may be used to move sensor 22 in a direction parallel to the x-y plane of FIG. 12 while alignment data such as light intensity data is gathered using sensor 22. The intensity of light 98 may remain constant during alignment operations. The detected intensity of light 98 by sensor 22 may change due to the changing position of sensor 22 with respect to aperture 64.

Sensor 22 may be moved to a predetermined set of positions or may be continuously moved until the detected light intensity of light 98 reaches a predetermined minimum. Light intensity data may be gathered at each position for sensor 22 or may be continuously gathered. An optimal sensor position (i.e., an aligned position) for sensor 22 may be determined from the gathered intensity data.

The aligned position may be a position at which the detected light intensity in the gathered light intensity data is a maximum intensity. This type of maximum intensity position may be determined by selecting a position at which the intensity data is a maximum intensity, by fitting a mathematical function to the intensity data and determining an extremum of the mathematical function, by selecting a midpoint between two equal intensity data points or using other suitable maximum determining procedures.

In the example of FIG. 13, alignment data is gathered by generating light 26 using a light-emitting component such as light-generating component 46 (e.g., an LED or an infrared LED) so that light 26 passes through aperture 64 and onto camera 84. If desired, camera 84 may be mounted to a masking structure such as structure 100 that prevents light other than light 26 from being detected by camera 84. Camera 84 may be a fully integrated device with an imaging sensor or may be an imaging sensor having one or more light-sensitive elements without integrated structures such as a housing and a lens.

Actuating members 86 may be used to move sensor 22 in a direction parallel to the x-y plane of FIG. 13 while alignment data such as light intensity data is gathered using camera 84.

The intensity of light 26 from light-generating element 46 may remain constant during alignment operations. The detected intensity of light 26 by camera 84 may change due to the changing position of sensor 22 with respect to aperture 64.

Sensor 22 may be moved to a predetermined set of positions or may be continuously moved until the detected light intensity of light 26 reaches a predetermined minimum. Light intensity data may be gathered by camera 84 at each position for sensor 22 or may be continuously gathered. An aligned position for sensor 22 may be determined from the gathered intensity data.

The aligned position may be a position at which the detected light intensity in the gathered light intensity data is a maximum intensity as described above in connection with FIG. 12.

In the example of FIG. 14, alignment data is gathered by generating light 26 using a light-emitting component such as light-generating component 46 (e.g., an LED or an infrared LED) so that light 26 passes through aperture 64 and a portion 28 of light 26 is reflected back through aperture 64 onto light-sensitive component 48 of sensor 22. If desired, light-reflecting structure 102 (e.g., a metal plate or other infrared-reflective structure) may be placed over aperture 64 during alignment operations to increase reflected portion 28 of light 26. Light 26 may be emitted from element 46 onto structure 102 and reflected portion 28 of light 26 may be reflected back through aperture 64.

Actuating members 86 may be used to move sensor 22 in a direction parallel to the x-y plane of FIG. 14 while alignment data such as light intensity data is gathered using element 46 and element 48 of sensor 22. The intensity of light 26 from light-generating element 46 may remain constant during alignment operations. The detected intensity of reflected portion 28 by element 48 may change due to the changing position of sensor 22 with respect to aperture 64.

Sensor 22 may be moved to a predetermined set of positions or may be continuously moved until the detected light intensity of reflected light 28 reaches a predetermined minimum. Light intensity data may be gathered by element 48 at each position for sensor 22 or may be continuously gathered. An aligned position for sensor 22 may be determined from the gathered intensity data.

The aligned position may be a position at which the detected light intensity in the gathered light intensity data is a maximum intensity as described above in connection with FIG. 12.

Following determination of an optimally aligned position for sensor 22 as described above in connection with FIGS. 12, 13, and/or 14, sensor 22 may be moved vertically (i.e., along the z-direction) so that structure 60 is adjacent to cover layer 14A.

As shown in the examples of FIGS. 12, 13, and 14, support structure 60 may have a shape that is different from the shape shown in FIGS. 3, 5, 6, and 7. In the examples of FIGS. 12, 13, and 14 support structure 60 includes a portion that is formed along edges of sensor 22 and a portion that wraps over a portion of a top surface of sensor 22 (e.g., a surface that interfaces with cover layer 14A). During assembly operations, liquid adhesive 54' may be applied to the portion that wraps over a portion of the top surface of sensor 22.

Figure 15:
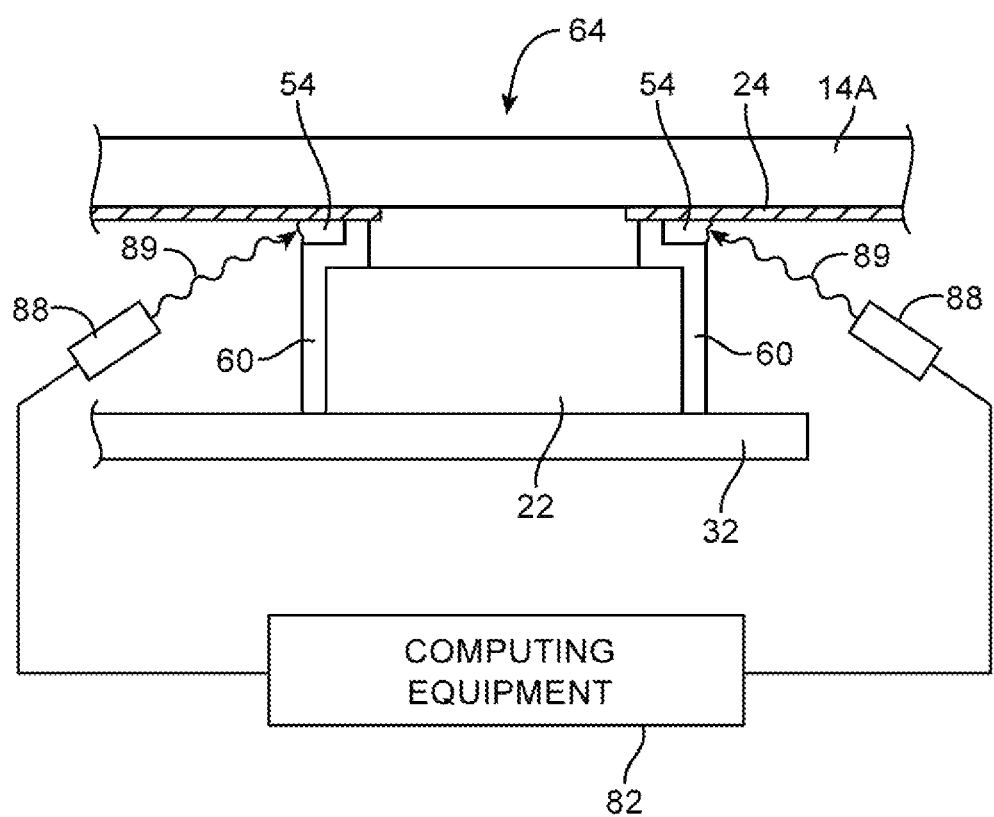
FIG. 15 is a cross-sectional side view of an illustrative light sensor showing how light may be used to cure adhesive that secures a light sensor that has been optically aligned to an aperture to a housing structure in accordance with an embodiment of the present invention.

As shown in FIG. 15, light sources 88 may be used to illuminate liquid adhesive 54' that has been applied to the portion that wraps over a portion of the top surface of sensor 22 with light such as UV light 89. In this way, structure 60 may be attached to layer 14A. In the configuration show in FIG. 15, structure 60 may be formed from a UV transparent material or a material that is substantially opaque to UV light. Light 89 may illuminate adhesive 54' directly or some or all of light 89 may pass through UV transparent portions of structure 60 onto adhesive 54'. However this is merely illustrative. A support structure having the shape of structure 60 of FIG. 5 or any other suitable shape may be used during the alignment and assembly operations for sensor 22 and device 10 described above in connection with FIGS. 12, 13, and/or 14.

Figure 16:
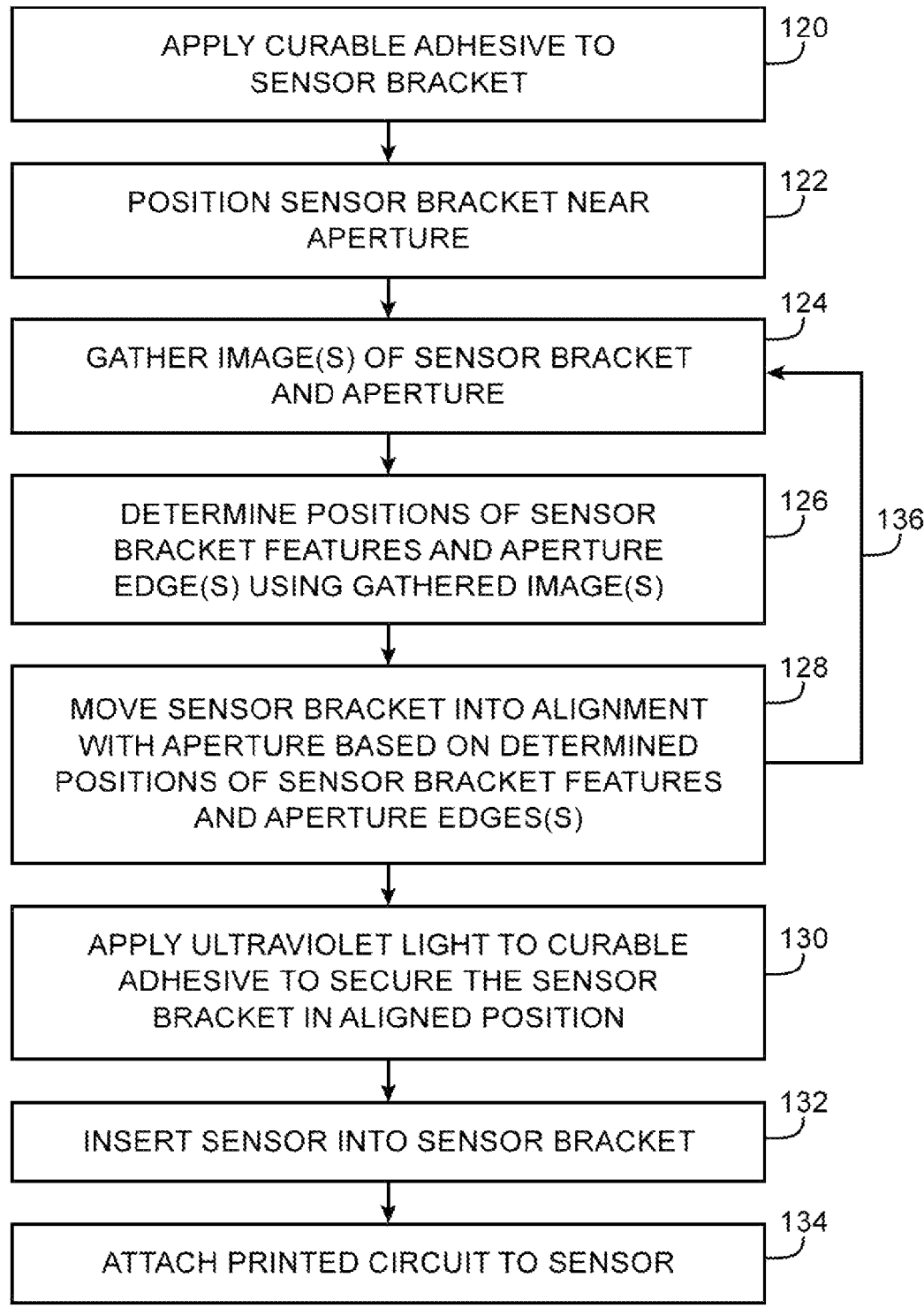
FIG. 16 is a flow chart of illustrative steps involved in aligning a light sensor to an aperture by viewing the aperture through an opening in a support structure for the light sensor in accordance with an embodiment of the present invention.

FIG. 16 is a flow chart of illustrative steps that may be used in mounting a light sensor adjacent to an aperture using a support structure having an opening as described above in connection with, for example, FIGS. 6 and 7.

At step 120, a curable adhesive such as a light curable adhesive (e.g., a UV light curable adhesive) may be applied to a support structure such as a sensor bracket for a light sensor such as sensor 22 (e.g., a proximity sensor or an ambient light sensor). The curable adhesive may be provided on an extended portion of the support structure, on a portion of the support structure that wraps onto a top surface of the sensor, or elsewhere on the support structure. The curable adhesive may be provided on a portion of the support structure that is transparent to UV light.

At step 122, the support structure (sensor bracket) may be placed near a transparent aperture in an opaque portion of a housing structure such as a cover layer for a display.

At step 124, alignment data such as images may be gathered of the support structure and of the aperture through the support structure.

At step 126, the position of sensor bracket features such as one or more edges of the support structure and the position of one or more edges of the aperture may be determined using the gathered images.

At step 128, the support structure (sensor bracket) may be moved into alignment with the aperture based on the determined positions of the edge(s) of the support structure and the edge(s) of the aperture.

At step 130, light such as ultraviolet light may be applied to the curable adhesive to secure the support structure to the housing structure in the aligned position. The ultraviolet light may be applied to the curable adhesive through a UV transparent portion of the support structure.

At step 132, a light sensor such as a proximity sensor or an ambient light sensor may be attached to the support structure (e.g., by inserting the light sensor into an opening in the support structure).

At step 134, a printed circuit such as a flexible printed circuit may be attached to the light sensor (e.g., by soldering electrical contacts on the flexible printed circuit to electrical contacts on the light sensor using a hot bar).

Figure 17:
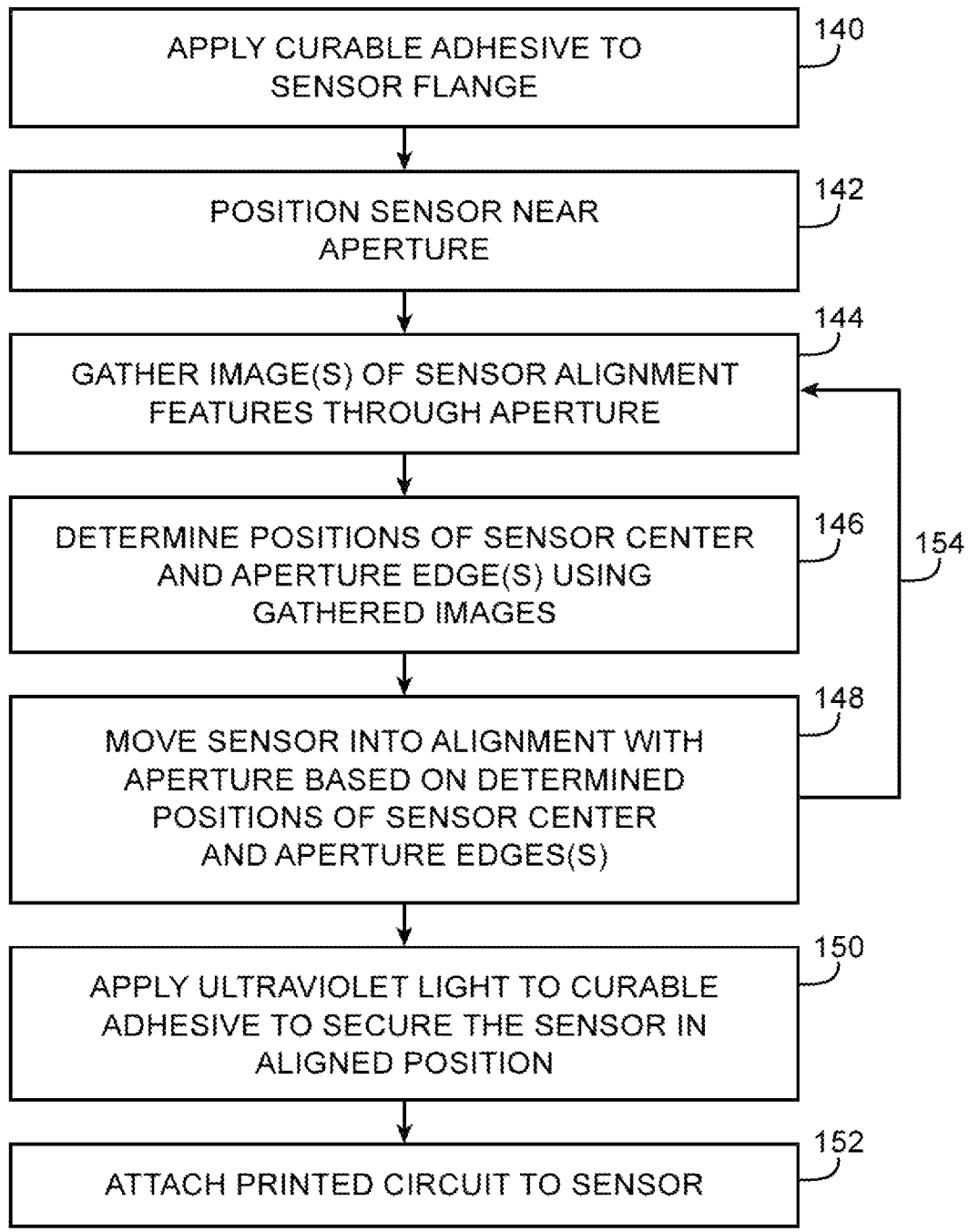
FIG. 17 is a flow chart of illustrative steps involved in aligning a light sensor to an aperture by viewing alignment features on the light sensor through the aperture in accordance with an embodiment of the present invention.

FIG. 17 is a flow chart of illustrative steps that may be used in mounting a light sensor adjacent to an aperture using alignment marks on the light sensor as described above in connection with, for example, FIGS. 8, 9, 10, and 11.

At step 140, a curable adhesive such as a light curable adhesive (e.g., a UV light curable adhesive) may be applied to a light sensor such as sensor 22 (e.g., a proximity sensor or an ambient light sensor). The curable adhesive may be provided on an extended portion of the light sensor that is transparent to UV light.

At step 142, the light sensor may be placed near a transparent aperture in an opaque portion of a housing structure such as a cover layer for a display.

At step 144, alignment data such as images may be gathered of the aperture and the alignment features on the light sensor as viewed through the aperture.

At step 146, the position of light sensor features such as a center point of the light sensor and the position of one or more edges of the aperture may be determined using the gathered images.

At step 148, the light sensor may be moved into alignment with the aperture based on the determined positions of light sensor features and the edge(s) of the aperture.

At step 150, light such as ultraviolet light may be applied to the curable adhesive to secure the light sensor to the housing structure in the aligned position. The ultraviolet light may be applied to the curable adhesive through a UV transparent portion of the light structure.

At step 152, a printed circuit such as a flexible printed circuit may be attached to the light sensor (e.g., by soldering electrical contacts on the flexible printed circuit to electrical contacts on the light sensor using a hot bar).

Figure 18:
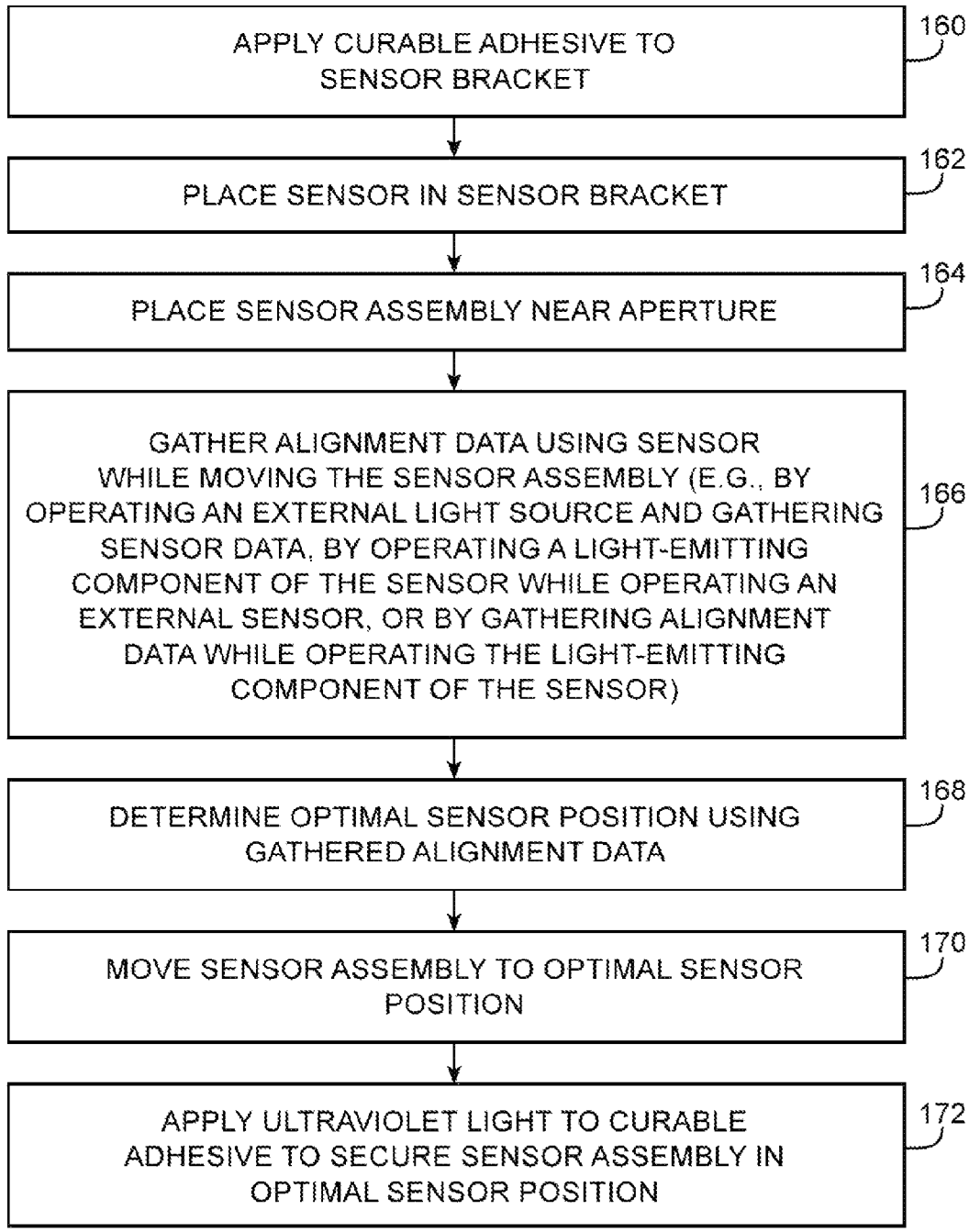
FIG. 18 is a flow chart of illustrative steps involved in aligning a light sensor to an aperture by gathering alignment data using the light sensor in accordance with an embodiment of the present invention.

FIG. 18 is a flow chart of illustrative steps that may be used in mounting a light sensor adjacent to an aperture by gathering alignment data using the light sensor as described above in connection with, for example, FIGS. 12, 13 and 14.

At step 160, a curable adhesive such as a light curable adhesive (e.g., a UV light curable adhesive) may be applied to a support structure such as a sensor bracket for a light sensor such as sensor 22 (e.g., a proximity sensor or an ambient light sensor). The curable adhesive may be provided on an extended portion of the support structure, on a portion of the support structure that wraps onto a top surface of the sensor, on elsewhere on the support structure. The curable adhesive may be provided on a portion of the support structure that is transparent to UV light.

At step 162, the light sensor may be placed into an opening in the sensor bracket. If desired step 162 may be performed prior to step 160.

At step 164, the sensor assembly (i.e., the light sensor and support structure) with the flexible printed circuit attached may be placed near a transparent aperture in an opaque portion of a housing structure such as a cover layer for a display.

At step 166, alignment data such as light intensity data may be gathered using the light sensor while moving the sensor assembly with respect to the aperture. Gathering alignment data using the light sensor while moving the sensor assembly with respect to the aperture may include operating and external light source and gathering intensity data using the light sensor (see, e.g., FIG. 12), operating a light-emitting component of the light sensor while operating an external sensor such as a camera (see, e.g., FIG. 13), or gathering alignment data using a light-sensitive component of the light sensor while operating the light-emitting component of the light sensor (see, e.g., FIG. 14).

At step 168, an optimal sensor position (i.e., an aligned position for the light sensor) may be determined using the gathered alignment data. The optimal sensor position may be a position at which the detected light intensity in the gathered alignment data is a maximum intensity. This type of maximum intensity position may be determined by selecting a position at which the intensity data is a maximum intensity, fitting a mathematical function to the intensity data and determining an extremum of the mathematical function, by selecting a midpoint between two equal intensity data points or using other suitable maximum determining procedures.

At step 170, the sensor assembly may be moved into the optimal sensor position.

At step 172, light such as ultraviolet light may be applied to the curable adhesive to secure the sensor assembly to the housing structure in the optimal sensor position. The ultraviolet light may be applied to the curable adhesive through a UV transparent portion of the support structure or may be applied directly to the adhesive.

The foregoing is merely illustrative of the principles of this invention and various modifications can be made by those skilled in the art without departing from the scope and spirit of the invention.

What is claimed is:

1. An electronic device, comprising:
   a housing structure having at least one opaque portion;
   a transparent aperture in the opaque portion; and
   a light sensor mounted against the transparent aperture in the opaque portion so that light passes through the transparent aperture onto the light sensor, wherein the light sensor comprises at least one alignment feature that is visible through the transparent aperture.

2. The electronic device defined in claim 1 wherein the light sensor comprises an ambient light sensor.

3. The electronic device defined in claim 1 wherein the light sensor comprises a proximity sensor.

4. The electronic device defined in claim 3 wherein the proximity sensor comprises a light-emitting portion and a light-receiving portion.

5. The electronic device defined in claim 4 wherein the proximity sensor comprises a first lens in the light-emitting portion and a second lens in the light-receiving portion and wherein the at least one alignment feature comprises first and second alignment marks formed between the first lens and the second lens.

6. The electronic device defined in claim 5 wherein the first and second alignment marks comprise alignment marks that are molded in a surface of the proximity sensor.

7. The electronic device defined in claim 1, further comprising a display, wherein the housing structure comprises a cover layer for the display.

8. The electronic device defined in claim 7 wherein the cover layer comprises a transparent material and wherein the at least one opaque portion of the housing structure comprises a portion of the transparent material that is covered by an opaque masking layer.

9. The electronic device defined in claim 1 wherein the light sensor comprises an extended portion that is transparent to ultraviolet light.

10. The electronic device defined in claim 9, further comprising an ultraviolet light cured adhesive interposed between the extended portion of the light sensor and the housing structure that attaches the light sensor to the housing structure.

11. An electronic device, comprising:
    a transparent substrate;
    an opaque masking layer on the transparent substrate;
    an opening in the opaque masking layer;
    a support structure having an opening, wherein the support structure is attached to the transparent substrate and wherein the opening of the support structure is aligned with the opening in the opaque masking layer; and
    a light sensor in the opening of the support structure that receives light through the opening in the opaque masking layer.

12. The electronic device defined in claim 11 wherein the support structure includes an extended portion and wherein the electronic device further comprises adhesive that attaches the extended portion to the transparent substrate.

13. The electronic device defined in claim 12 wherein the adhesive comprises an ultraviolet light cured adhesive and wherein the extended portion of the support structure comprises a material that is transparent to ultraviolet light.

14. The electronic device defined in claim 11 wherein the light sensor comprises a light-sensitive element and a lens that focuses the light onto the light-sensitive element.

15. The electronic device defined in claim 14 wherein the light sensor further comprises a light-generating element.

16. The electronic device defined in claim 15 wherein the light-generating element comprises a light-emitting diode that generates at least infrared light.

17. A method for mounting a light sensor in an electronic device using a support structure for the light sensor, wherein the support structure includes an opening, and wherein the electronic device includes a housing structure with a transparent aperture, the method comprising:
   gathering images of the support structure;
   gathering images of the aperture through the opening in the support structure;
   aligning the support structure with the aperture using the gathered images of the support structure and the gathered images of the aperture; and
   attaching the support structure to the housing structure.

18. The method defined in claim 17, further comprising:
   inserting the light sensor into the opening in the support structure.

19. The method defined in claim 18 wherein attaching the support structure to the housing structure comprises curing a light curable adhesive by passing light onto the light curable adhesive through a transparent portion of the support structure.

20. The method defined in claim 17 wherein aligning the support structure with the aperture using the gathered images of the support structure and the gathered images of the aperture comprises:
   determining a location of an edge of the aperture using the gathered images of the aperture; and
   determining a location of an edge of the opening in the support structure using the gathered images of the support structure.

21. A method for mounting a light sensor having alignment features in an electronic device having a housing structure with a transparent aperture, the method comprising:
   gathering at least one image of the alignment features through the transparent aperture;
   aligning the light sensor to the transparent aperture using the gathered at least one image of the alignment features; and
   securing the aligned light sensor to the housing structure.

22. The method defined in claim 21 wherein aligning the light sensor to the transparent aperture using the gathered at least one image of the alignment features comprises:
   determining a location of a center point of the light sensor using the at least one image; and
   determining at least one location on an edge of the aperture using the at least one image.

23. The method defined in claim 21 wherein securing the aligned light sensor to the housing structure comprises illuminating light-sensitive adhesive by transmitting light through a transparent extended portion of the light sensor.

24. A method for mounting a light sensor in an electronic device having a housing structure with an aperture, the method comprising:
   gathering alignment data using the light sensor;
   determining an aligned position for the light sensor with respect to the aperture;
   moving the light sensor to the determined aligned position; and
   attaching the light sensor to the housing structure in the aligned position.

25. The method defined in claim 24, wherein gathering the alignment data using the light sensor comprises transmitting light from an external light source onto the light sensor through the aperture.

26. The method defined in claim 24 wherein gathering the alignment data using the light sensor comprises transmitting light from a light-emitting element in the light sensor onto a camera through the aperture.

27. The method defined in claim 24 wherein gathering the alignment data using the light sensor comprises transmitting light from a light-generating component of the light sensor through the aperture onto a reflective object.

28. The method defined in claim 27 wherein gathering the alignment data using the light sensor further comprises receiving a reflected portion of the transmitted light at a light-sensitive component of the light sensor and wherein the reflected portion of the light has passed from the reflective object back through the aperture.

* * * * *